United States Patent [19]

Treber et al.

[11] Patent Number: 5,303,038
[45] Date of Patent: Apr. 12, 1994

[54] CIRCUIT ARRANGEMENT FOR A/D CONVERSION OF THE COLOR INFORMATION COMPONENTS OF TWO PICTURE SIGNALS

[75] Inventors: Hermann Treber, Hamburg; Eckhart Pech, Ammersbek, both of Fed. Rep. of Germany

[73] Assignee: U.S. Philips Corporation, New York, N.Y.

[21] Appl. No.: 755,385

[22] Filed: Sep. 5, 1991

[30] Foreign Application Priority Data

Sep. 7, 1990 [DE] Fed. Rep. of Germany ....... 4028424

[51] Int. Cl.[5] .............................................. H04N 9/00
[52] U.S. Cl. ..................................... 348/708; 348/469; 348/705
[58] Field of Search ..................... 358/12, 14, 51, 181, 358/22, 23, 21 R

[56] References Cited

U.S. PATENT DOCUMENTS

| 3,133,148 | 5/1964 | Rennick | 358/15 |
| 3,700,793 | 10/1972 | Borsuk et al. | 358/15 |
| 4,163,248 | 7/1979 | Heitmann | 358/12 |
| 4,821,086 | 4/1989 | McNeely et al. | 358/22 |
| 4,958,230 | 9/1990 | Jonnalagadda et al. | 358/15 |

FOREIGN PATENT DOCUMENTS 0309976 9/1988 European Pat. Off. .

Primary Examiner—John K. Peng
Assistant Examiner—Edward Lefkowitz
Attorney, Agent, or Firm—Edward W. Goodman

[57] ABSTRACT

For the possibly simultaneous A/D conversion of two color difference signals of a first picture signal as well as a carrier-frequency chrominance signal of a second picture signal, a relevant circuit arrangement is provided with a multiplexer (3) by which a time-division multiplex signal is generated from the two color difference signals, in which time-division multiplex signal the two color difference signals alternate in time and which is added to the chrominance signal in an adder (5) to form a sum signal which is applied to an A/D converter (10) which is followed by a separating filter (11) for separating the digital time-division multiplex signal from the digital chrominance signal.

8 Claims, 1 Drawing Sheet

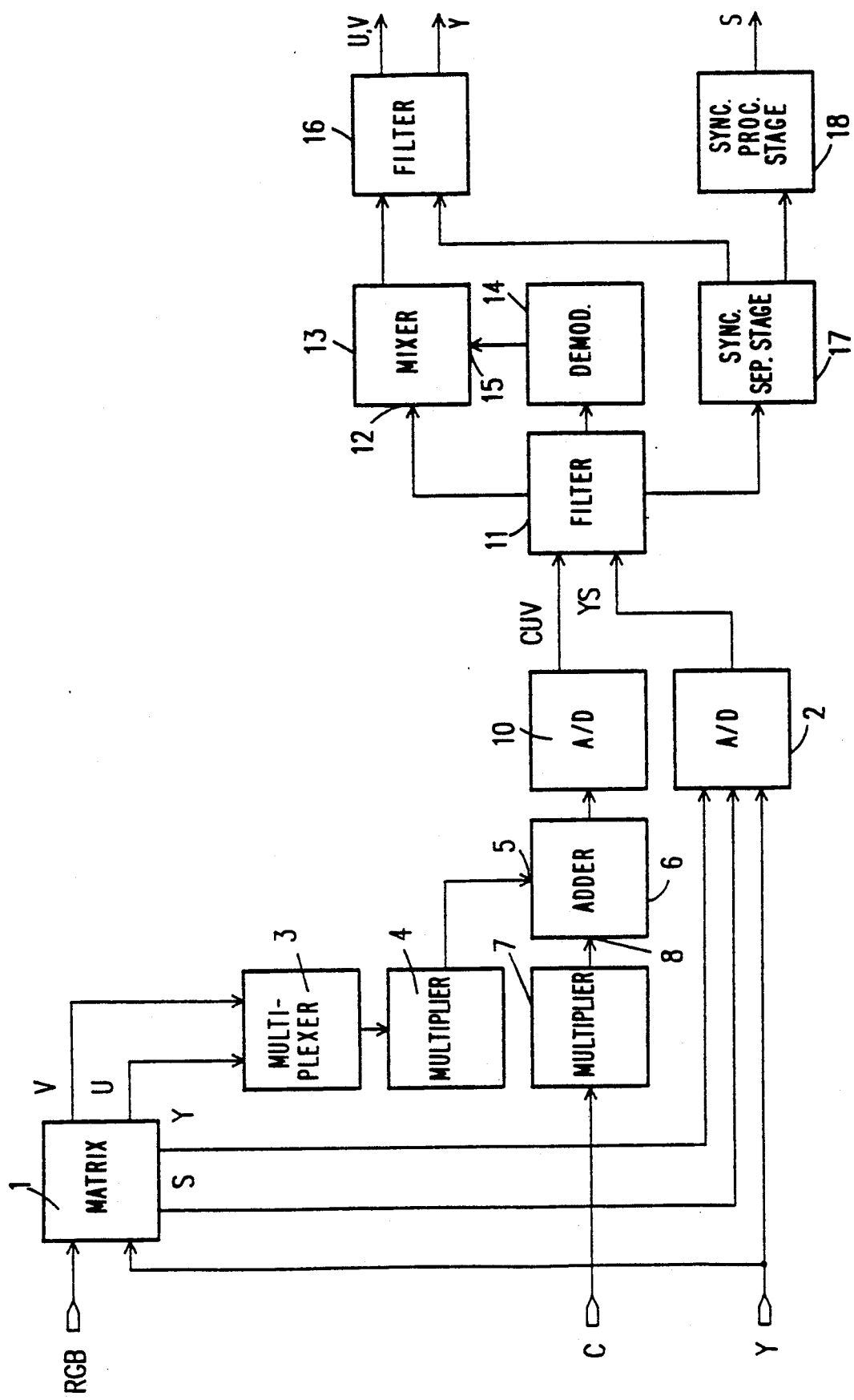

CIRCUIT ARRANGEMENT FOR A/D CONVERSION OF THE COLOR INFORMATION COMPONENTS OF TWO PICTURE SIGNALS

BACKGROUND OF THE INVENTION

1. Field of the Invention

The invention relates to a circuit arrangement for A/D conversion of two color difference signals of a first picture signal and/or a carrier-modulated chrominance signal of a second picture signal.

2. Description of the Related Art

For example, if two chrominance signals are to be processed in a television receiver, both the luminance signals of these picture signals and their chrominance information components must be converted to the digital domain. If, for example, the picture of one picture signal is to be inserted into the picture of the other picture signal, the luminance signals of the two picture signals can be alternately applied to an A/D converter, for example, via a switch. In the further digital signal processing of these luminance signals the switch-over between the two luminance signals does not lead to any problems. However, this is different particularly when processing a chrominance signal at the carrier frequency. Such a carrier-frequency chrominance signal must be converted to the baseband by means of a demodulator. However, such a demodulator has considerable transients when a signal is only temporarily available. Similar problems occur when the chrominance information components of the two picture signals are available as chrominance signals at the carrier frequency. Thus, it is necessary that in such a case the relevant chrominance signal to be demodulated is continuously applied to the demodulator. For this reason it is not possible, or at least detrimental, to switch over before the A/D converter, for example, between the two color difference signals of the one picture signal and the carrier-modulated chrominance signal of the other picture signal. In fact, in this case the demodulator would only temporarily receive the carrier-modulated chrominance signal so that transients which are clearly visible on a display screen will result after each switching process.

In known color television receivers, this problem is solved in that the chrominance information components of the two picture signals have their own A/D converter. However, since particularly A/D converters involve high costs, such a solution is not very economical.

SUMMARY OF THE INVENTION

The invention has, inter alia, for its object to provide a circuit arrangement which avoids this problem.

According to the invention, this object is solved in that a multiplexer is provided by means of which a time-division multiplex signal is generated from the two color difference signals, in which time-division multiplex signal the two color difference signals alternate in time and which is added to the chrominance signal in an adder to form a sum signal which is applied to an A/D converter which is followed by a separating filter for separating the digital time-division multiplex signal from the digital chrominance signal.

Thus, only one A/D converter is required for the simultaneous A/D conversion of the two color difference signals of the one picture signal as well as of the carrier-modulated chrominance signal of the other picture signal. The sampling clock of this converter is in the frequency range of the carrier-modulated chrominance signal, which range is essentially higher or reaches higher values than that of the two color difference signals. Consequently, the two color difference signals require a smaller sampling rate than that for the carrier-modulated chrominance signal. This makes it possible to convert the two color difference signals into a time-division multiplex signal in which the values of the two color difference signals alternate. In the conventional television standards, this time-division multiplex signal is in a frequency range below 2 MHz. The sidebands of the carrier-modulated chrominance signal maximally reach as far down as 2 MHz. Thus the time-division multiplex signal and the carrier-frequency chrominance signal can be superimposed and added in the analog range. The resultant sum signal is now applied to the A/D converter. In the digital range the time-division multiplex signal can be separated again from the carrier-frequency color difference signal by filters.

In addition to the advantage that only one A/D converter is required for the two chrominance information components, there is the further advantage that particularly for the carrier-modulated chrominance signal the resolution does not deteriorate because it is applied to the A/D converter uninterruptedly with respect to time, i.e. it is not switched over only temporarily by a switch. The circuit arrangement according to the invention thus permits the simultaneous conversion by only one A/D converter of the two color difference signals as well as of the carrier-frequency chrominance signal without any noticeable deterioration of the picture quality.

In the digital domain the two color difference signals at the output of the A/D converter and at the output of the separating filter are present in the form of the time-division multiplex signal in which the sampling values of the two color difference signals alternate. Dependent on the form of the further digital signal processing, the color difference signals can be further processed in this manner. If the color difference signals are to be separated again, an embodiment of the invention is characterized in that the separating filter is followed by a demultiplexer in which the digital color difference signals which are present in the digital time-division multiplex signal are separated.

According to a further advantageous embodiment of the invention, the range of values of the A/D converter is such that alternatively only the two color difference signals or only the chrominance signal can be converted and in that during the periods when all three signals are to be converted simultaneously these signals are multiplied by a factor of 0.5 before the A/D conversion and by a factor of two after the A/D conversion.

The above-described circuit arrangement according to the invention can be used for simultaneously converting the chrominance information components of the two picture signals to the digital domain. It is of course also possible to convert only the chrominance information components of one of the picture signals at a time, thus either the two color difference signals or the carrier-modulated chrominance signal. If the range of values of the A/D converter is to be fully utilized so as to obtain an optimum signal-to-noise ratio in this case, in which only one of the two chrominance information components is converted, the two chrominance information components can still be optionally converted simultaneously. In order that the range of values of the A/D converter is not exceeded in this case, the two color difference signals as well as the chrominance signal are multiplied by a factor of 0.5 before the A/D conversion during the periods when both of them must be processed. This ensures that the sum signal does not have higher values than either the two color difference signals or the chrominance signal alone. After the A/D conversion this factor must be eliminated again by multiplying the digital signal by a factor of two.

The multiplication by the factor of 0.5 can be performed at different positions before the A/D converter. In an embodiment of the invention, the time-division multiplex signal and the chrominance signal are multiplied by the factor of 0.5 before their addition in the adder.

The same applies to the elimination of this factor by multiplying the digital signal by the factor of two. According to an embodiment of the invention, the signal supplied by the A/D converter is multiplied by the factor of two in the separating filter.

In a further embodiment of the invention, the time-division multiplex signal is generated in the multiplexer in such a way that the sum signal applied to the A/D converter comprises the same color difference signal during two consecutive sampling instants in said converter.

The time-division multiplex signal must be generated in the multiplexer in such a way that the values of the two color difference signals are represented often enough in the time-division multiplex signal and that they are sampled by the A/D converter often enough so as to fulfil the sampling theorem. However, it is not desirable to switch too often between the two color difference signals in the time-division multiplexer because transients may occur at each switching process. Therefore, it has been found to be advantageous to switch between the two color difference signals in the multiplexer in such a way that each time for two consecutive sampling instants of the sampling process in the A/D converter the sum signal applied to this converter comprises two values of the same color difference signal. Thus, in this case the values of the one color difference signal are applied to the A/D converter for two sampling values, the values of the other color difference signal are applied for the subsequent two sampling values and two values of the first color difference signal are applied subsequently, and so forth. Consequently, behind the separating filter, two values of a color difference signal each time alternate with each other in the digital time-division multiplex signal.

For this manner of generating the time-division multiplex signal a further embodiment is characterized in that only the value of the color difference signal supplied at the second of the successive sampling instants is evaluated in the digital domain.

Since in the digital domain two values of one color difference signal are successively present, only the second of these successive values can be evaluated in the digital range, particularly to suppress transients caused by the multiplexer. On the one hand, this provides the possibility of a certain suppression of transients, and, on the other hand, the sampling theorem is still fulfilled.

In a further embodiment of the invention, an interpolation is performed for the sampling values of the two color difference signals in such a way that the sampling values of the two color difference signals are present at the same instants.

As a result of the time interleaving of the values of the two color difference signals in the time-division multiplex signal and in the sum signal the two color difference signals are sampled in the A/D converter at different instants. For example, at a first and a second sampling instant the values of the one color difference signal are sampled and at the subsequent third and fourth instants those of the second color difference signal are sampled. If each time the second values are evaluated, i.e. the values found at the second and fourth sampling instants, these values are, however, not produced at simultaneous sampling instants. For picture display it may therefore be advantageous to interpolate the values of the color difference signals in the digital domain at the output of the A/D converter, in which interpolation the values of one of the two color difference signals are recalculated at to the sampling instants of the other color difference signal. Such interpolation filters are known per se.

A further embodiment of the invention is characterized in that for processing an RGB signal, the multiplexer is preceded by a matrix which gains the two color difference signals and one luminance signal from the RGB signal.

As explained hereinbefore, the circuit arrangement according to the invention is designed in such a way that, if necessary, it simultaneously converts two color difference signals of the one picture signal as well as a carrier-frequency chrominance signal of another picture signal to the digital domain. The circuit arrangement is, however, also suitable for simultaneously converting the chrominance information components of an RGB signal as well as the carrier-frequency chrominance signal of another picture signal to the digital domain. To this end, the RGB signal is converted into a luminance signal and into the other two color difference signals by means of a matrix preceding the multiplexer. These two color difference signals can then be converted together with the carrier-frequency chrominance signal in the manner described hereinbefore.

BRIEF DESCRIPTION OF THE DRAWING

These and other aspects of the invention will now be described in greater detail with reference to the sole FIGURE in the drawing showing a block-schematic diagram of an embodiment of the invention.

DESCRIPTION OF THE PREFERRED EMBODIMENT

Two picture signals, viz. an RGB signal and a picture signal which is present in a separated form as a luminance signal Y and a carrier-frequency signal C are applied to the circuit arrangement shown in the FIGURE.

The FIGURE not only shows the circuit arrangement according to the invention for A/D conversion of the chrominance information components of these two picture signals but also the A/D conversion of the two luminance signals as well as a part of the further signal processing behind the separating filter of the circuit arrangement according to the invention.

The RGB signal is a picture signal which comprises three separate signals each indicating the luminance of the three chrominance components red, green and blue. In the circuit arrangement these three red, green and blue signals are applied to a matrix 1 in the way as is shown in the FIGURE. In this matrix 1 the RGB signals are converted in known manner into a luminance signal Y and two color difference signals U and V. A synchronizing signal, which is required for later picture display (not shown in the FIGURE), is gained in the matrix 1. Both the luminance signal Y and the synchronizing signal S are applied to an A/D converter 2 in which the luminance signals as well as the synchronizing signals are A/D converted. The two color difference signals U and V which, as shown in the FIGURE, are supplied by the matrix 1, may possibly also be supplied directly in this form so that the matrix 1 is then of course dispensed with.

The two color difference signals U and V are applied to a multiplexer 3 in which a time-division multiplex signal is generated. To this end, there is a change-over between the two color difference signals U and V in the multiplexer 3 so that values of the two color difference signals alternate in the time-division multiplex signal.

The time-division multiplex signal thus generated is multiplied by a factor of 0.5 in a multiplier 4 and is subsequently applied to a first input 5 of an adder 6.

The luminance signal Y of the other picture signal is applied to the matrix 1 and to the A/D converter 2. The carrier-modulated chrominance signal of this picture signal, which is denoted by C in the FIGURE, is multiplied by a factor of 0.5 in a multiplier 7 and after this multiplication it is applied to a second input 8 of the adder 6.

The two color difference signals U and V, which are converted into a time-division multiplex signal in the multiplexer 3, have a frequency range which reaches up to a maximum of 2 MHz. However, also the carrier-frequency chrominance signal C of the other picture signal maximally reaches with its sidebands as far down as 2 MHz. As a result of the addition of these two signals in the adder 6, a signal is produced which quasi-represents a frequency-division multiplex signal of these two components. Signal portions of the two color difference signals only occur in the frequency range below 2 MHz of this signal, while signal portions of the carrier-frequency chrominance signal C only occur in the frequency domain above 2 MHz. This sum signal is applied to an A/D converter 10 which converts it to the digital range.

The digital sampling values supplied by the A/D converter 2 and the A/D converter 10 are applied to a separating filter 11 in the digital section of the circuit arrangement. In this separating filter 11, the input signal supplied by the A/D converter 10 is multiplied by a factor of two. Furthermore, the separating filter 11 filters the sampling values supplied by the A/D converter 10 in such a way that signal portions below 2 MHz and signal portions above 2 MHz are separated. The signal portions below 2 MHz represent those of the two color difference signals U and V. and are applied to a first input 12 of a mixer 13. The signal portions above 2 MHz represent the carrier-frequency chrominance signal C converted to the digital domain, which signal is applied to a demodulator 14. In this demodulator 14 the carrier-frequency chrominance signal is converted to the baseband and subsequently applied to a second input 15 of the mixer 13. In the mixer 13, a mixing or change-over can now be carried out between the color difference signals U and V applied to the first input 12 of this mixer and the chrominance signal converted to the baseband and applied to the second input 15 of this mixer. The mixer 13 then supplies a corresponding chrominance signal to an output filter 16.

Further, in the separating filter 11 the luminance and synchronizing signals supplied by the A/D converter 2 are filtered out, which signals are applied to a separating stage 17 in which the luminance signal is again separated from the signal components of the synchronizing signal. The luminance signal is applied to the output filter 16, while the synchronizing signal is further processed in a further processing stage 18 and is finally available as a synchronizing signal for further signal processing.

The output filter 16 thus supplies a luminance signal Y and two color difference signals U and V. These digital signals are the digital signals, mixed in the desired manner, of the two input signals which were originally available in an analog form, viz. the RGB signal and the Y/C signal.

It is of course possible to perform a different signal processing of these signal components at the output of the separating filter whose outputs convey the two color difference signals and the carrier-frequency chrominance signal. For example, it is possible to further process these signal components separately.

It has proved to be advantageous to form the sampling clocks particularly of the A/D converter 10 and the switching clock with which a change-over between the two color difference signals U and V applied to the multiplexer 3 is performed in this multiplexer in such a way that a change-over between these two signals is effected in the multiplexer 3 after every second sampling clock of the A/D converter 10. Consequently, at two successive sampling processes in the A/D converter 10, the same color difference signal is comprised in the sum signal applied to this converter. In the signal processing operation after the A/D converter 10 the second values of the color difference signals are evaluated in a manner not shown in the FIGURE. This is advantageous because the first values of the color difference signals have been produced immediately after switching the multiplexer 3 to the other color difference signal. These switching processes may, however, cause transients which are suppressed by evaluating only the second sampling values.

So far it has been assumed in this description that the A/D converter 10 has a range of values which is designed to process either the two color difference signals U and V or the carrier-frequency chrominance signal C. To avoid overload of the A/D converter 10 when simultaneously processing the signals, the two multipliers 4 and 7 are provided. In the separating filter 11 the digital values are corrected again in this case. This range of values of the A/D converter provides the advantage that in the case of A/D conversion of either only the two color difference signals or only the chrominance signal the range of values of the A/D converter 10 is fully utilized also in this case. In this case the multipliers 4 and 7 are switched off, and the digital signal is no longer multiplied by a factor of two in the separating filter. The advantage of this solution is that the range of values of the A/D converter can be fully utilized for processing only either the two color difference signals or the carrier-frequency chrominance signal, so that a maximum possible signal-to-noise ratio of the digital values is available.

It is of course also possible to design the A/D converter 10 in such a way that it is suitable for simultaneously processing the color difference signals as well as the carrier-frequency chrominance signal. In this case the two multipliers 4 and 7 as well as the multiplier in the separating filter 11 can be eliminated. However, if by means of such an arrangement either only the two color difference signals or only the carrier-frequency chrominance signal are to be processed, the range of values of the A/D converter 10 is not fully utilized so that the digital signal supplied by this modulator does not have the best possible signal-to-noise ratio.

We claim:

1. A circuit arrangement for A/D conversion of two color difference signals of a first picture signal and a carrier-modulated chrominance signal of a second picture signal, characterized in that said circuit arrangement comprises:
   a multiplexer for generating a time-division multiplex signal from the two color difference signals, in which the two color difference signals alternate in time;
   an adder for forming a sum signal of the time-division multiplex signal and the chrominance signal;
   an A/D converter for digitally converting the sum signal; and
   a separating filter coupled to receive the digitally converted sum signal for separating the digital time-division multiplex signal from the digital chrominance signal.

2. A circuit arrangement as claimed in claim 1, characterized in that the separating filter is followed by a demultiplexer in which the digital color difference signals which are present in the digital time-division multiplex signal are separated.

3. A circuit as claimed in claim 10, characterized in that the range of values of the A/D converter is equal to a range value of either the two color difference signals or the chrominance signal.

4. A circuit arrangement as claimed in claim 3, characterized in that said circuit arrangement further comprises means for separately multiplying the time-division multiplex signal and the chrominance signal by a factor of 0.5 before their addition in the adder.

5. A circuit arrangement as claimed in claim 3, characterized in that the separating filter comprises means for multiplying the signal supplied by the A/D converter by a factor of two.

6. A circuit arrangement as claimed in claim 10, characterized in that a switching rate of the multiplexer is one-half a sampling rate of the A/D converter, whereby the sum signal applied to the A/D converter comprises the same color difference signal during two successive sampling instants in said converter.

7. A circuit arrangement as claimed in claim 1, characterized in that for processing an RGB signal the multiplexer is preceded by a matrix which forms the two color difference signals and one luminance signal from the RGB signal.

8. A circuit arrangement as claimed in claim 4, characterized in that the separating filter comprises means for multiplying the signal supplied by the A/D converter by a factor of two.

* * * * *